Sept. 5, 1961  J. C. SINGLETON  2,998,724
LIQUID LEVEL GAUGE
Filed Oct. 31, 1956  2 Sheets-Sheet 1

INVENTOR.
John C. Singleton
BY *J. P. Moran*
ATTORNEY

Sept. 5, 1961  J. C. SINGLETON  2,998,724
LIQUID LEVEL GAUGE
Filed Oct. 31, 1956  2 Sheets-Sheet 2
FIG. 3
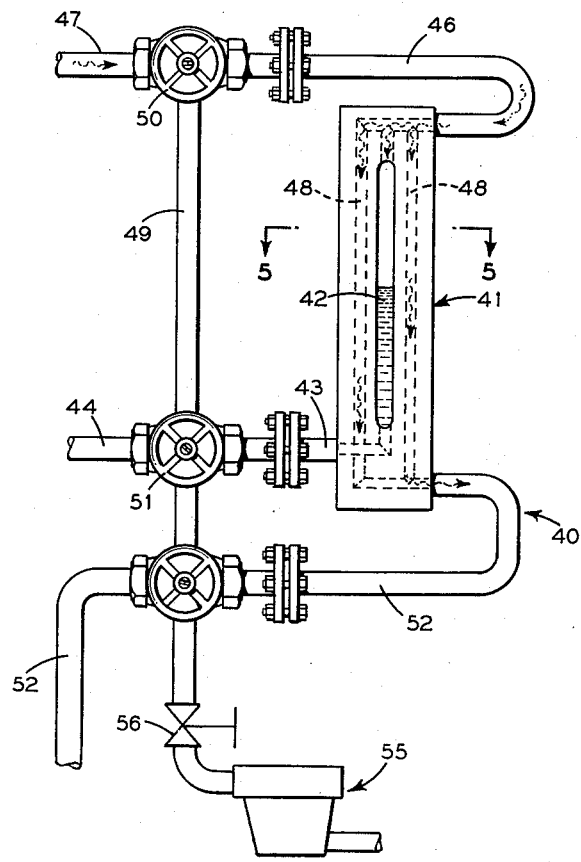
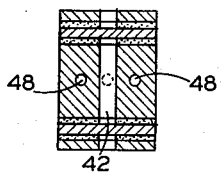
FIG. 5
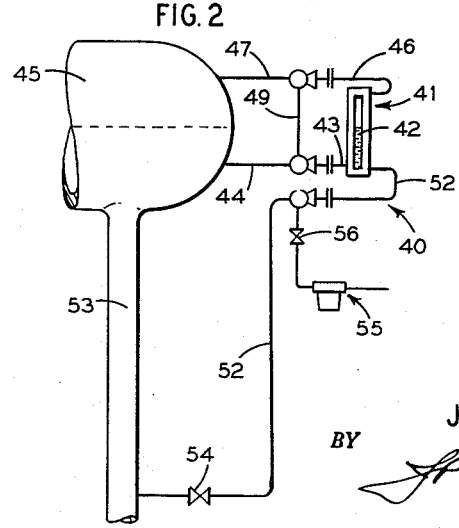
FIG. 2
*INVENTOR.*
John C. Singleton
BY
*J. P. Moran*
ATTORNEY

United States Patent Office

2,998,724
Patented Sept. 5, 1961

2,998,724
LIQUID LEVEL GAUGE
John C. Singleton, Lancaster, Ohio, assignor to The Babcock & Wilcox Company, New York, N.Y., a corporation of New Jersey
Filed Oct. 31, 1956, Ser. No. 619,470
10 Claims. (Cl. 73—323)

This invention relates to a liquid-vapor vessel and more particularly to a liquid level indicator therefor to accurately indicate the substantially true level of the liquid within the vessel in a high pressure, high temperature system.

In a fluid heating apparatus, as for example in a high pressure steam generator or the like, it is essential that the liquid level in the liquid-vapor vessel or drum of a boiler unit or the like be accurately known and capable of visual observation at all times. Heretofore, liquid levels in such liquid-vapor vessels were generally observed by means of a gauge having a liquid column visible through a glass or other transparent windows in the column enclosure, the upper end of the column being connected in communication with the vapor space of the vessel by means of a vapor conduit and the lower end of the column connected in communication with the liquid space of the vessel by a liquid conduit. Since it was usually necessary to position the liquid gauge at remote distances from the vessel, the liquid standing in the liquid column of the gauge was subjected to a temperature depression as a result of heat loss due to radiation from the gauge means and its connectors. This temperature depression of the liquid standing in the gauge being known in the art as the "cold leg" effect.

As a result of this "cold leg" phenomena, the liquid standing in the gauge column is rendered denser than that of the liquid in the vessel or drum, thereby causing the same to stand at a much lower level than that of the actual level of the liquid within the drum, the difference between the level of the liquid standing in the vessel relative to that standing in the gauge column constituting a gauge error. This gauge error is further aggravated or magnified in units operating at relatively high pressures in that not only is saturation temperature greatly increased, but the change in density in liquid per degree of temperature is greater; and at very high pressures the gauge error is further increased as a result of the unbalanced vapor head which occurs in the gauge as the liquid level in the gauge departs from the liquid level of the vessel. Therefore, liquid level gauge errors of six or more inches have often resulted which unless compensated for in some manner may result in serious operating difficulties.

An object of this invention is to provide in a liquid-vapor vessel or drum a remotely connected indicator consisting of a gauge means having an enclosed liquid column with an observable upper level in which the temperature and density of the gauge liquid column is maintained substantially equal to the temperature and density of the liquid within the vessel, thereby substantially eliminating gauge errors resulting from the "cold leg" effect.

Another object of this invention is to provide a liquid-vapor drum of a steam generator or the like with a liquid level gauge having a visible water column in which the water in the column is maintained at substantially saturated temperature by a natural circulation of drum fluid from the drum to the gauge means.

Still another object of this invention is to provide a liquid-vapor vessel with a gauge means having a liquid column in which the "cold leg" effect, which tends to produce a temperature depression of the gauge column, is utilized to produce a flow of the drum fluid through the gauge to heat the liquid standing in the liquid column so that the latter is maintained at substantially the same temperature and density as the liquid in the vessel.

According to this invention the gauge errors which are a direct result of the "cold leg" effect are avoided by utilizing the heat of the fluid within the drum to maintain the temperature of the gauge liquid column at substantially the same temperature and density as the liquid within the drum. This is accomplished by a natural circulation of the drum fluid to the gauge column whereby the heat therefrom is transmitted to the lower portion of the liquid column thereby substantially eliminating the temperature depression of the liquid column due to radiation; the circulation of the drum fluid to the gauge means being enhanced by connecting the means carrying the drum fluid to the gauge means in communication with a downcomer tube. In one form of the invention this is accomplished by disposing a gauge means having a liquid column between a pair of spaced, outwardly projecting stub headers which are respectively connected in communication with the liquid and vapor spaces of the liquid-vapor vessel of a vapor generator. A circulatory conduit connected to the liquid header adjacent the lower end of the gauge liquid column connects the liquid header in communication with a downcomer. Thus, the natural circulation of the generating system provides constant circulation of the heated liquid from the vessel through the liquid connection of the gauge means. The heated fluid circulating through the liquid connection cooperating with the heat liberated by the vapor condensate above the liquid column maintains the temperature of the liquid standing in the gauge column at or substantially very close to the saturation temperatures of the liquid within the vessel. In this form of the invention since the gauge means is generally disposed between the drum liquid and vapor connections so as to indicate the level of the liquid in the vessel during normal operation, a second gauge means may be provided to indicate the liquid level within the vessel between the flooded and normal operating conditions. This is accomplished by connecting the second or upper level gauge means between the upper or normally considered vapor connection and the vent means of the vessel, the top of the water column of the second gauge means being disposed above the internal top-most portion of the vessel.

In another form of the invention, the "cold leg" effect responsible for false level indications of the gauge is eliminated by providing heating means independent of the vapor introduced to the top of the liquid column chamber. This is accomplished by circulating additional vapor through vapor passages about the full length of the gauge column wherein the passages are in heat transfer relationship to the liquid column. This is accomplished by providing the gauge body with bored vapor passageways which are connected in communication with the vapor conduit means in communication with the vapor space of the vessel, the lower end of the liquid column being connected in communication with the liquid space by a second conduit means. According to this form of the invention, the lower portion of the vapor passageways are connected to a drain means discharging into a downcomer at a point sufficiently below the lower end of the gauge body to insure that the level of any vapor condensate formed in the drain and standing therein will fall below the bottom of the column, thus enabling the liquid gauge column to be completely exposed to the vapor flowing in the passageways surrounding the column. Consequently, the temperature of the liquid standing in the gauge liquid column is maintained for all practical purposes at substantially the saturation temperature of the liquid within the drum.

In still another form of the invention the liquid circulatory means of the first mentioned form of the invention is utilized in conjunction with the vapor circulatory feature of the second mentioned form of the invention so that one supplements the other to further insure that the density of the liquid standing in the gauge column is maintained substantially equal to that of the liquid in the vessel.

A feature of this invention resides in the provision of means for connecting the gauge means to a downcomer of a liquid vapor vessel of a vapor generator to establish a natural circulation of the heated fluid of the vessel to the gauge means to substantially eliminate gauge errors due to "cold leg" effect.

Another feature of this invention resides in the provision of providing the gauge body with means for circulating vapor emanating from the liquid-vapor vessel through the gauge body, the latter having means for passing any condensate formed therein to a downcomer connected to the vessel.

Still another feature of this invention resides in the provision of a circulatory means connecting a gauge liquid column in communication with a downcomer of a vapor generator to establish a circulatory flow path for the liquid standing in the column.

Still another feature of this invention resides in the provision of an improved indicating means for indicating the substantially true liquid level of a liquid-vapor vessel which is relatively inexpensive, simple in construction and positive in operation.

Other features and advantages will be readily apparent when considered in view of the drawings and specification in which:

FIG. 2 is a schematic front view of still another embodiment of the instant invention.

FIG. 3 is an enlarged detail front view of the improved liquid column gauge means utilized in the embodiment of FIG. 2.

FIG. 5 is a plane sectional view taken along lines 5—5 of FIG. 3.

Figure 1:
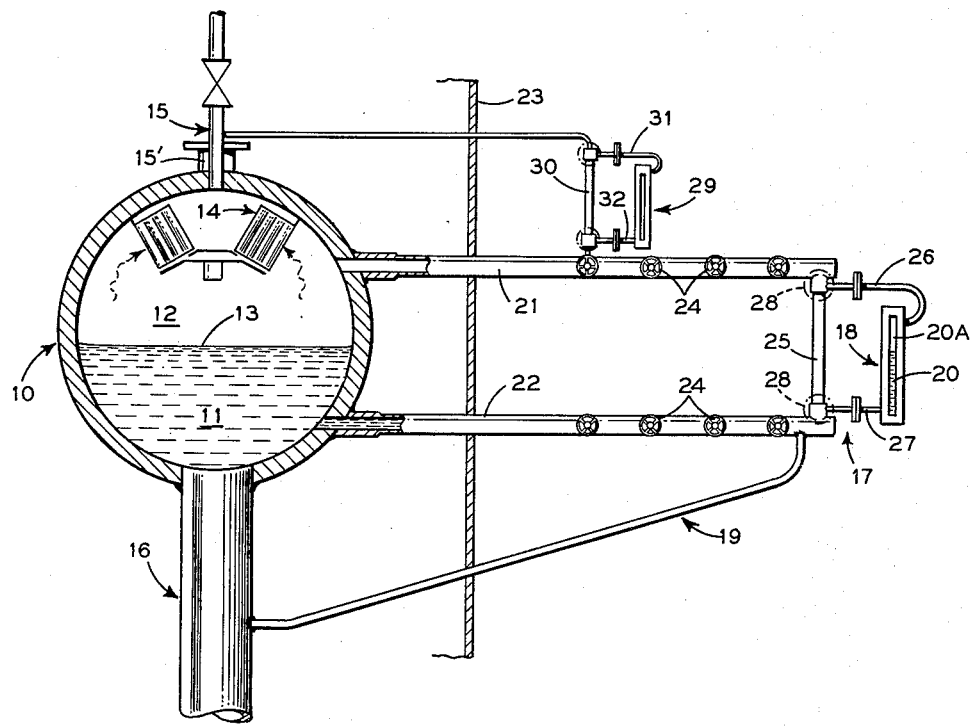
FIG. 1 is an end view of one embodiment of the invention having portions thereof shown in section.

While the instant invention is applicable for use with vapor generators generally, for purposes of illustration and description particular reference is made to high pressure steam generators, as for example a boiler unit of a central power station. Referring to the drawings the liquid-vapor vessel or drum 10 consists of an elongated member having a liquid space 11 and a vapor space 12, the liquid space normally containing a liquid level 13 therein. As shown the drum 10 is further provided with a steam separator 14, a venting means 15, a steam outlet 15' and a water downcomer 16, the latter being in communication with the water space for connecting the same in communication with a lower water drum (not shown). As the water level within the drum is subjected to fluctuation in accordance to the various operating conditions and load requirements on the boiler, it is exceedingly important that the actual water level within the drum be accurately known and observable at all times. According to this invention the actual water level is rendered readily ascertainable without the necessity of computing or compensating for gauge errors resulting from the "cold leg" effect due to the remoteness at which the gauge is usually positioned from the drum as was heretofore the customary practice.

In this invention an improved indicating means 17 in the form of a water gauge means 18 is utilized to indicate the actual water level within the drum. The gauge means consist of a body having a window for permitting visual observation of the water level within the gauge. Included as part of the indicating means 17 is an auxiliary circulatory means 19 for connecting the gauge means in communication to the downcomer for establishing a natural liquid circulation to the gauge, the liquid flow emanating from the drum and passing to the gauge means and to the downcomer. As a result of this auxiliary circulation of the heated liquid of the drum through the gauge, the water column 20 thereof is maintained for all practical purposes at substantially saturated temperature of the water within the drum. Since there is relatively no change in the density of the water standing in the gauge column relative to that of the water standing in the drum, the level of the gauge column represents the substantially true indication of the water level within the drum. Thus, the level within the drum can be readily known by simply observing the gauge level.

As the drum 10 can be extremely long in some installations, it often times happens that the water level may vary between the ends thereof. For this reason stub headers 21 and 22 may be positioned at any desired position of the drum, but preferably the center portion. As shown in FIG. 1 the headers 21 and 22 extend outwardly of the drum and beyond the casing 23 of the boiler unit, the lower or liquid stub header 22 being connected in communication with the water space of the drum and the upper or vapor stub header 21 being connected in communication with the steam space of the drum. While an intermediate portion of the headers 21 and 22 may be bent so that the outer end portion may extend substantially parallel to the casing or axis of the drum 10, the illustrated form of the invention discloses the headers 21 and 22 extending outwardly and perpendicularly to the casing since this construction is deemed more economical in that connections for other regulating, recording or indicating instruments (not shown) may be connected therebetween on either sides thereof. As shown the headers are provided with additional valved connections 24 suitable for receiving such instruments.

According to this invention, the outer end portions of the header are connected by a hollow structural support tube 25 for supporting the water level gauge means 18 having a water column 20, the gauge having a glass window whereby the top of the water level of the column may be visually observed. The upper end of the water column 20 is connected by means of a pipe 26 in communication with the vapor header 21 and the lower end of the column is connected in communication by another pipe 27 to the liquid header 22. Thus, in the absence of any "cold leg" effect the conditions affecting the gauge water column would be the same as those affecting the water in the drum, and the true level of the water in the drum would be indicated by the gauge. However, because of this "cold leg" effect which is present as a result of the heat loss due to radiation from the gauge means and connection therefor, the water standing in the column is cooled, thereby becoming more dense than that of the water in the drum. As a result thereof the level of the column 20 would tend to stand at a lower level than that of the water in the drum. In a very high pressure system the level of the liquid standing in the water gauge tends to stand at an even lower level because of an increased or unbalanced vapor head which is present in the gauge as a result of the difference in water levels between that of the drum and column 20 due to the cold leg effect.

In order to overcome gauge errors of this type, a circulatory means 19 is provided connecting the liquid header 22 adjacent the lower end of the water column to the downcomer 16. By this arrangement it will be noted that the natural circulation of the system permits the saturated water of the drum to circulation through the stub header 22 transmitting heat thereto and thereby compensating for most of the heat loss due to radiation. Further the heat liberated by the condensation of the steam in the vapor space 20A of the column and transmitted to the water column 20 tends to compensate for heat loss due to radiation of the gauge body, the condensation of the steam which occurs above the water level of the column providing a head sufficient to allow the water standing in the column to circulate to the downcomer. Thus, the circulation of the water through the gauge, which is established, together with the flow through the gauge connections enables the temperature of the water column 20 to be maintained at substantially saturated temperature. If desired suitable valves 28 may be disposed at either end of the support tube 25, so that the flow of vapor and liquid to the gauge may be shut off in the event it becomes necessary to replace or remove the gauge means or glass windows for any reason.

Since the gauge arrangement described is usually positioned so as to indicate the level within the drum during normal operations thereof, a second or upper gauge means 29 may be provided whereby water levels between the flooded and normal operating conditions may be indicated. As illustrated in FIG. 1 this is accomplished by connecting a support tube 30 to the upper header 21 and in communication with the vent means 15 of the drum, the gauge 29 being connected by suitable conduits 31 and 32 to the support tube so that the vertical height of the gauge embraces the upper sector of the drum. This is accomplished by locating the uppermost part of the vertical gauge height approximately 2 inches above the inner-most portion of the drum. Thus water level condition between the flooded and normal operating positions may be indicated by said second gauge.

In another form of the invention as illustrated in FIGS. 2 and 3, it may be desirable to circulate the steam through the gauge body so as to be in heat transfer relationship with the water column so that the flow of steam through the gauge may be utilized for maintaining the water column heated to substantially the saturation temperature of the water standing within the drum.

In this form of the invention the indicating means 40 is provided with a body means 41 encasing the liquid or water column 42 of the gauge, the lower end of the column being connected by a water inlet pipe 43 to the water connection 44 of the drum 45. As shown the upper end of the gauge is connected by a vapor or steam inlet pipe 46 to the steam connection 47, the latter being in communication of the vapor chamber of the drum. The steam inlet pipe 46 has an outlet end in communication with the upper end of the water column 42 and steam passageways 48 which extend the length of the body 41 in heat transfer relationship to the full length of the column 42. Disposed between the steam and water connections is the support tube 49 and the usual shut-off valves 50 and 51 to which the gauge means is connected.

In order that the heating fluid may flow through the passageways 48 of the gauge body 41, a circulatory means in the form of a drain conduit 52 is provided, the conduit 52 connecting the lower end of the passageways 48 to the downcomer 53. Thus the heating fluid or steam and any condensate which may be formed in the passageway is free to circulate through the gauge means and to the downcomer; the encased water column 42 being heated by the flow thereof.

According to this form of the invention, the drain conduit 52 is connected to the downcomer at a point sufficiently below the gauge means so that the level of any amount of condensate which is formed therein will fall below the bottom portion of the water column of the gauge. For this reason the enclosing structure of the water column is exposed throughout its entire length to the steam flow. If desired a shut-off valve 54 may be disposed in the drain conduit for cutting off flow to the downcomer.

To facilitate starting up operations of the steam generator at which time the passageways 48 of gauge body are usually flooded with water, means are provided to bleed the same. Accordingly, a starting trap 55 is connected in line with the drain conduit 52, a manual valve 56 being disposed in the line leading thereto. With valve 56 open the water in the passageways 48 can be bled to the trap as the initial steam is being generated, thus establishing the flow of water and steam through the gauge. Upon bleeding of the water from the jacket, the valve 56 is closed, thereby permitting the steam and/ or condensate in the passageways 48 to flow to the downcomer 53. In this manner the water column 42 of the gauge is effectively heated so that the temperature and density of the gauge water column is maintained at substantially the same condition as the water within the drum. Thus the actual water level within the drum may be accurately known by a simple observation of the water gauge.

Figure 4:
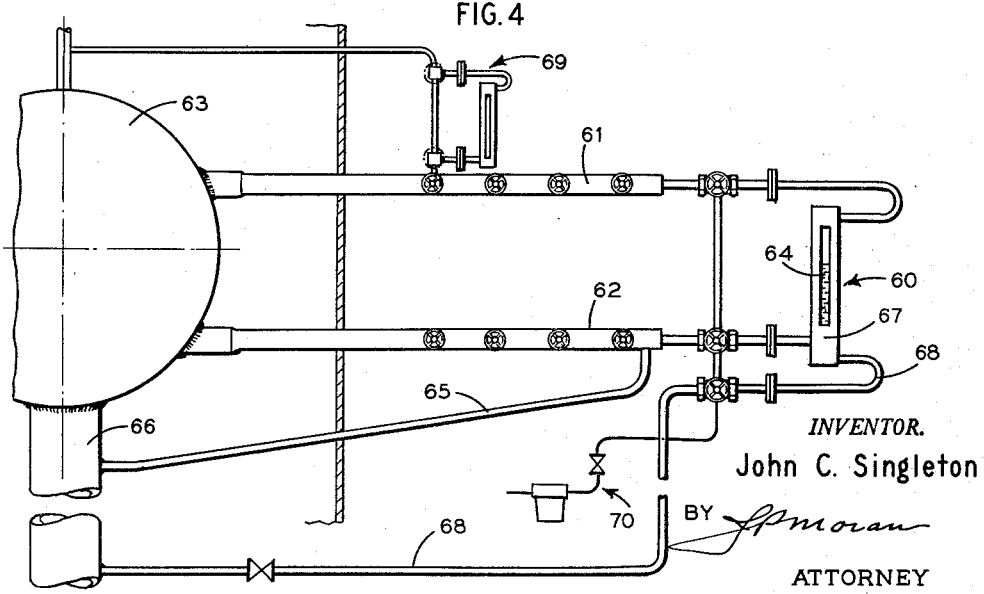
FIG. 4 is an end view of still another modified form of the invention.

In the form of the invention illustrated in FIG. 4, the circulation of the saturated liquid of the drum through the liquid connection 62 is utilized in conjunction with the flow of steam through the gauge body, so that one complements the other in maintaining the water within the water column at substantially the same conditions as the water standing within the drum. This is accomplished by disposing the gauge body 60, which is similarly constructed with steam passageways, as herein described, between the headers 61 and 62 which are connected to the drum 63 (see FIG. 4). Thus the saturated water is permitted to flow to the gauge water column 64 and through the circulatory conduit 65 connecting the liquid header 62 adjacent the lower end of the water column 64 and then to the downcomer 66 as herein described with reference to FIG. 1. The steam is allowed to flow from the drum steam space to the gauge body, flowing through the passageways and through the drain conduit 68 to the downcomer 66 in the manner hereinbefore stated. According to this invention, it will be noted that the drain 68 is connected to the downcomer 66 at a lower point than that of the water circulatory means 65. In all other respects, the drum 63, stub headers 61 and 62, upper gauge means 69 and starting trap 70 are substantially identical as hereinbefore described with reference to FIGS. 1 to 3. If desired, the gauge body and the gauge connection of the forms described may be provided with an insulating cover to further reduce any heat loss due to radiation.

From the foregoing, it will be noted that the water column 64 is maintained at substantially saturated temperature and pressure by a circulation of the heated drum fluid through the liquid connection and to the gauge body proper whereby either the heated vapor or liquid or both emanating from the drum may complement each other to compensate for heat loss due to radiation of the gauge and its connections. As a result of this circulation of the drum fluid to gauge, the heat loss due to radiation or cooling of the water column is substantially reduced, thus tending to materially reduce the gauge error due to the "cold leg" effect. Consequently, the level of the gauge water column will indicate substantially the actual water level within the drum, thus eliminating the need of compensation or computing for the "cold leg" effect.

While the instant invention is disclosed herein with particular reference to specific embodiments thereof, it is to be appreciated that the invention is not to be taken as limited to all of the details thereof, as modification and variations thereof may be made without departing from the spirit or scope of the invention.

What is claimed is:

1. For use in a high pressure steam generator, a steam and water drum having a steam space and a water space, said drum normally containing a water level therein and normally having steam and water mixtures discharged thereinto, a water gauge comprising a body having a sight glass for observing a water column, said body having a steam passageway adjacent the water column, a pair of spaced conduits connecting said gauge to said drum, one of said conduits conducting steam from the steam space directly to both the passageway and upper end of the water column and said other conduit connecting said water column in communication with said water space, a downcomer connected to said drum in communication with said water space, and a draining conduit connecting said steam passageway to said downcomer at a point sufficiently below the level of said water column so that said steam is free to flow by natural circulation through said passageway about the full length of said column for maintaining the density of the water standing in said column substantially equal to the density of the water in said drum so that the water level of said column is rendered a substantially accurate indication of the true water level in said drum.

2. For use in a high pressure steam generator, a water and steam drum having a water space and a steam space, said drum normally containing a water level therein and normally having steam and water mixtures discharged thereinto, a water gauge including a gauge body having a sight glass for observing a water column, said body having steam passageway in heat transfer relationship to said water column, a pair of spaced conduits remotely connecting said gauge to said drum, one of said conduits conducting steam from the steam space directly to the steam passageway and upper end of the water column and said other conduit connecting said water column in communication with said water space, a downcomer connected to said drum in communication with said water space and a draining conduit connecting said steam passageway to said downcomer at a point sufficiently below the level of said water column so that said steam is free to flow by natural circulation to said gauge body through said passageway about the full length of said column thereby maintaining the density of the water standing in said column substantially equal to the density of the water in said drum so that the water level of said column is rendered a substantially accurate indication of the true water level in said drum; said draining conduit having bleeding means connected thereto for bleeding said passageway in starting.

3. In a high pressure vapor generator, a liquid-vapor vessel having a liquid space and a vapor space, said vessel normally having a liquid level in said liquid space and normally having vapor and liquid mixtures discharged thereinto, a downcomer connected to said vessel in communication with said liquid space, a gauge means having a body for observing a liquid column, conduit means for remotely connecting said gauge means to said vessel, said conduit means including a pair of spaced, outwardly projecting stub headers connected to said vessel, one of said headers being connected to said liquid space and said other header to said vapor space, said headers connecting the opposite end portions of said body in communication with vapor space and liquid space respectively, and a circulator conduit connecting the liquid header adjacent the gauge connection thereof to said downcomer to establish a natural circulating flow of liquid through said liquid header for maintaining the temperature of the liquid flowing therein substantially equal to the liquid within said vessel, thereby reducing heat loss due to radiation of said header.

4. In a high pressure vapor generator, a liquid-vapor vessel having a liquid space, a vapor space and a vent therefor, said vessel normally having a liquid level in said liquid space and normally having vapor and liquid mixtures discharged thereinto, a downcomer connected to said vessel in communication with said liquid space; a pair of stub headers connected to and projecting outwardly of said vessel, said headers being connected to said vessel above and below the normal liquid level and in communication with said vapor and liquid space respectively, a gauge means having a body for observing a liquid column disposed between said headers and connected thereto for indicating various liquid levels within the vessel during normal operations; a circulator conduit connecting the lower liquid header adjacent the liquid end of said body to said downcomer to establish a natural circulating flow of liquid through said lower header for aiding the maintenance of the temperature of the liquid standing in said column subsantially equal to the temperature of the liquid within said vessel; and a second gauge means disposed between said vent and said upper vapor header, said second gauge having a body for observing a water column extending beyond the internal topmost portion of said vessel for indicating liquid level readings between flooded and normal operating conditions.

5. For use in a high pressure steam generator including a steam and water drum having a steam space and a water space, the latter normally containing a water level therein, a water gauge comprising a body having a sight glass for observing a water column, said body having a steam passageway adjacent the water column, a water conduit and a steam conduit remotely connecting said gauge to said drum, said steam conduit connecting the steam passageway and upper end of the water column in communication with said steam space and said liquid conduit connecting said water column in communication with said water space, a downcomer connected to said drum in communication with said drum water space, a drain means connecting said steam passageway to said downcomer at a point sufficiently below the level of said water column so that said steam circulates through said passageway about the full length of said water column, and a circulatory conduit connecting the water end of said column in communication with said downcomer whereby both the water in said column and steam in said passageway flows through said gauge by natural circulation to co-operate in maintaining the density of the water standing in said water column substantially equal to density of the water in said drum.

6. The invention as defined in claim 5, wherein said drain means is connected to said downcomer below the connection of said water circulatory conduit to said downcomer.

7. For use in a natural circulation high pressure steam generator including a steam and water drum having a steam space and a water space and a downcomer means connected to said water space, an improved water gauge means for indicating the substantially true level of the water within the drum, said means comprising a gauge body adapted to contain a visible water column, conduit means connecting said body in communication with said steam and water spaces, said body having a steam passageway in heat transfer relationship to said water column, means arranged to connect said passageway to said steam space, and draining means connecting said passageway to the downcomer means, said last two mentioned means providing for natural circulating the steam from said drum through said passageway and to the downcomer whereby said steam flowing therethrough compensates for heat loss due to radiation of said gauge body thereby maintaining the temperature and density of the water column substantially equal to the water in said drum.

8. For use in a natural circulation vapor generator having a drum having a liquid level separating a liquid space from a vapor space, and a downcomer connected to said drum in communication with said liquid space, a gauge means comprising a body having a sight glass for observing a liquid column, said body including a vapor passageway in communication with the liquid column, conduit means for remotely connecting the said liquid column and vapor passageway in communication with the liquid space and the vapor space, respectively, so that vapor is permitted to flow through the vapor passageway of said body in heat exchange relationship with the liquid column, and means connecting said liquid column and vapor passageway in communication with said downcomer for establishing a positive natural circulatory flow of both the liquid and vapor of said drum to and from said body so that each flow co-operates to prevent any substantial temperature depression of the liquid standing in said liquid column.

9. For use in a natural circulation vapor generator having a drum having a liquid level separating a liquid space from a vapor space, and a downcomer connected to said drum in communication with said liquid space, a gauge means comprising a body having a sight glass for observing a liquid column, said body including a vapor passageway in communication with the liquid column, conduit means for remotely connecting the said liquid column and vapor passageway in communication with the liquid space and the vapor space, respectively, so that vapor is permitted to flow through the vapor passageway of said body in heat exchange relationship with the liquid column, and means connecting said vapor passageway in communication with said downcomer for establishing a positive natural circulatory flow of the vapor of said drum to and from said body so that said flow minimizes any substantial temperature depression of the liquid standing in said liquid column.

10. For use in a natural circulation vapor generator having a drum for receiving a heated liquid-vapor fluid, said drum having a liquid level separating a liquid space from a vapor space, and a downcomer connected to said drum in communication with said liquid space, a gauge means for indicating the liquid level in said drum comprising a body having a sight glass for observing a liquid column, said body including a vapor passageway in communication with the upper end of the liquid column, conduit means for remotely connecting the said liquid column and vapor passageway in communication with the liquid space and the vapor space, respectively, so that vapor is permitted to flow through the vapor passageway of said body in heat exchange relationship with the liquid column whereby the vapor is condensed, and means connecting the vapor passageway of said body in communication with said downcomer for establishing a positive natural circulatory flow of fluid to and from said body for minimizing any substantial temperature depression of the liquid standing in said liquid column.

References Cited in the file of this patent

UNITED STATES PATENTS

| | | |
|---|---|---|
| 226,418 | Purves | Apr. 13, 1880 |
| 994,333 | Orth et al. | June 6, 1911 |
| 2,064,148 | Brelsford | Dec. 15, 1936 |
| 2,337,171 | Winton | Dec. 21, 1943 |

FOREIGN PATENTS

| | | |
|---|---|---|
| 13,123 | Great Britain | 1896 |
| 453,375 | Great Britain | Sept. 10, 1936 |
| 473,803 | Canada | May 22, 1951 |